US008854359B2

(12) United States Patent
Takenaka et al.

(10) Patent No.: US 8,854,359 B2
(45) Date of Patent: Oct. 7, 2014

(54) IMAGE PROCESSING APPARATUS, IMAGE PROCESSING METHOD, STORAGE MEDIUM, AND IMAGE PROCESSING SYSTEM

(75) Inventors: Hirokazu Takenaka, Kanagawa (JP); Noriyuki Terao, Miyagi (JP); Toru Harada, Kanagawa (JP); Yoshiaki Irino, Kanagawa (JP); Tomonori Tanaka, Kanagawa (JP); Hideaki Yamamoto, Kanagawa (JP); Nozomi Imae, Kanagawa (JP); Daisuke Bessho, Kanagawa (JP); Satoshi Sawaguchi, Kanagawa (JP); Kensuke Masuda, Kanagawa (JP); Hiroyuki Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 212 days.

(21) Appl. No.: 13/605,509

(22) Filed: Sep. 6, 2012

(65) Prior Publication Data
US 2013/0057542 A1 Mar. 7, 2013

(30) Foreign Application Priority Data
Sep. 7, 2011 (JP) ................................. 2011-194597

(51) Int. Cl.
*G06T 15/00* (2011.01)
*G06F 17/00* (2006.01)
*G06T 15/20* (2011.01)
*G06T 3/00* (2006.01)

(52) U.S. Cl.
CPC ............. *G06T 3/0031* (2013.01); *G06T 15/205* (2013.01)
USPC ............................ 345/419; 345/619; 345/653

(58) Field of Classification Search
None
See application file for complete search history.

(56) References Cited

U.S. PATENT DOCUMENTS

| 5,446,833 | A | 8/1995 | Miller et al. |
| 5,561,756 | A | 10/1996 | Miller et al. |
| 7,508,388 | B2 * | 3/2009 | Barfuss et al. ................ 345/418 |
| 2004/0032407 | A1 | 2/2004 | Ejiri et al. |
| 2010/0053325 | A1 | 3/2010 | Inagaki |
| 2011/0181689 | A1 * | 7/2011 | Kweon ........................... 348/37 |

FOREIGN PATENT DOCUMENTS

| JP | 11-073489 | 3/1999 |
| JP | 2005-184865 | 7/2005 |
| JP | 2010-062790 | 3/2010 |

OTHER PUBLICATIONS

"A Survey on Model Based Approaches for 2D and 3D Visual Human Pose Recovery" from Sensors, published Mar. 3, 2014.*
European Search Report dated Dec. 3, 2012.
Kim, D. et al., "Projective Texture Mapping with Full Panorama," Computer Graphics Forum, vol. 21, No. 3, pp. 421-430, Sep. 1, 2002.
Fleck, M., "Perspective Projection: The Wrong Imaging Model," Technical Report 95-01, pp. 1-30, Jan. 1995.

* cited by examiner

*Primary Examiner* — James A Thompson
(74) *Attorney, Agent, or Firm* — Harness, Dickey & Pierce, P.L.C.

(57) ABSTRACT

An image processing apparatus projecting 3D image data to 2D planar image data includes: an accumulation unit that accumulates the 3D image data having position coordinates and pixel values; an acquisition unit that acquires a display parameter, including a zoom parameter for changing image size, for the 2D image data to be created; a creation unit that creates the 2D image data from the 3D image data with the display parameter by determining a half view angle of the 3D image data and performing inverse projection transformation on the 2D image data while changing, in accordance with a change in the half view angle caused by the change in image size specified by the zoom parameter, an inverse projection transformation method applied to position coordinates used to create the 2D image data; and a display unit that displays the created 2D image data as a 2D planar image.

9 Claims, 9 Drawing Sheets

FIG. 1
BACKGROUND ART

| PROJECTION METHOD | PROJECTION TRANSFORMATION EQUATION | INVERSE PROJECTION TRANSFORMATION EQUATION |
|---|---|---|
| CENTRAL PROJECTION | $h = f \cdot \tan(\phi)$ | $\phi = \arctan(h/f)$ |
| STEREOGRAPHIC PROJECTION | $h = 2 \cdot f \cdot \tan(\phi/2)$ | $\phi = 2 \cdot \arctan(h/2/f)$ |
| EQUIDISTANT PROJECTION | $h = f \cdot \phi$ | $\phi = h/f$ |
| EQUISOLID ANGLE PROJECTION | $h = 2 \cdot f \cdot \sin(\phi/2)$ | $\phi = 2 \cdot \arcsin(h/2/f)$ |
| ORTHOGONAL PROJECTION | $h = f \cdot \sin(\phi)$ | $\phi = \arcsin(h/f)$ |

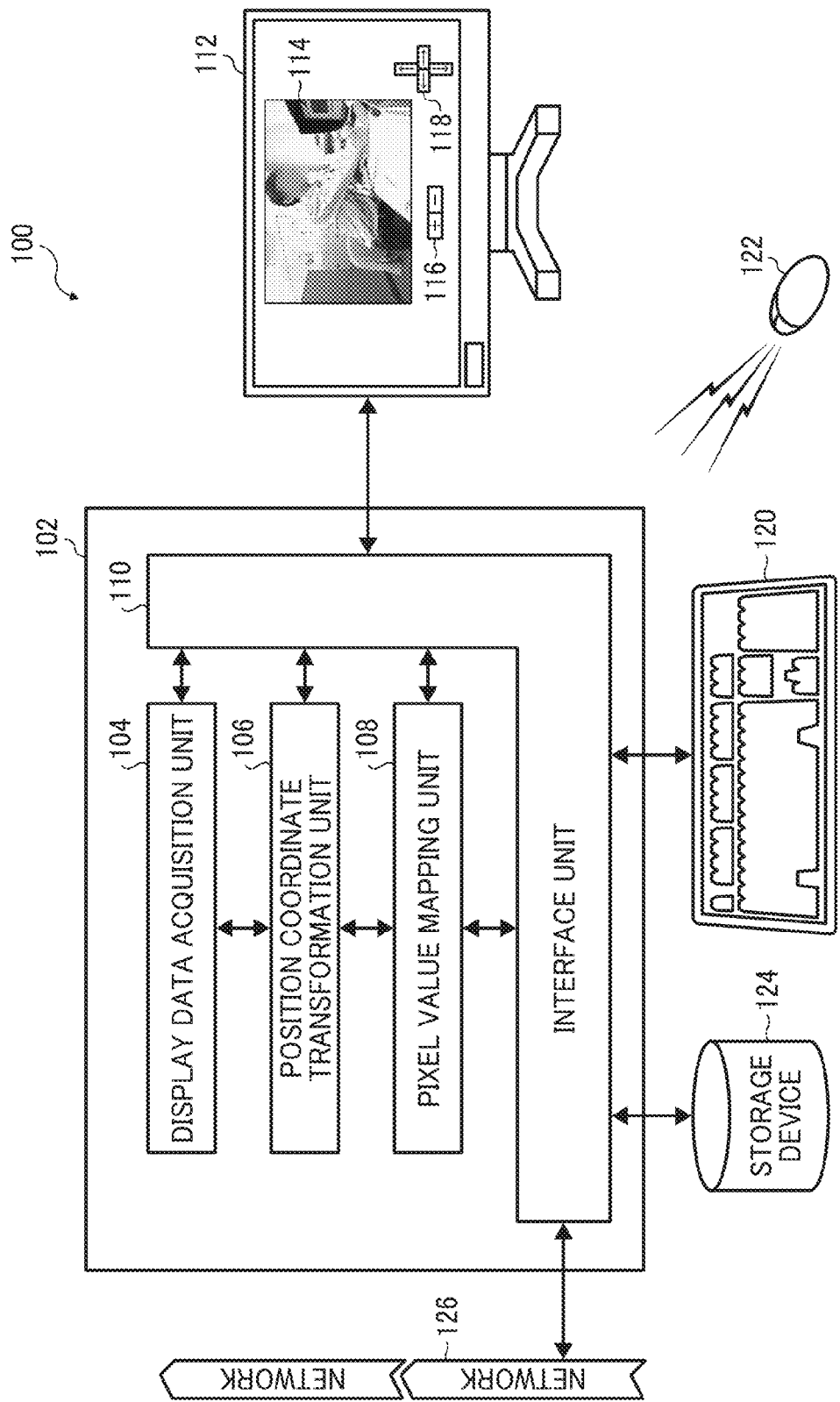

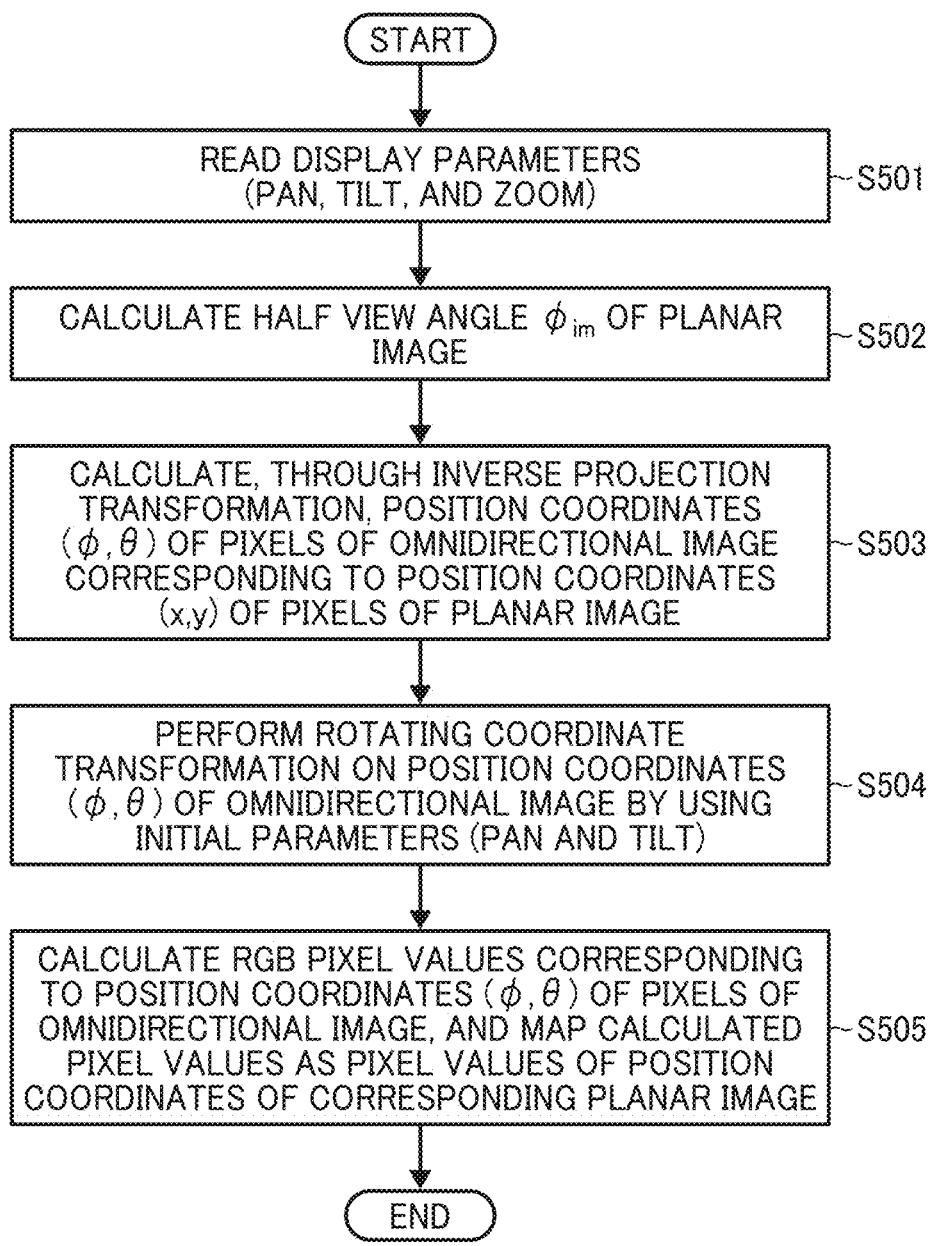

IMAGE PROCESSING APPARATUS, IMAGE PROCESSING METHOD, STORAGE MEDIUM, AND IMAGE PROCESSING SYSTEM

CROSS-REFERENCE TO RELATED APPLICATION

This patent application is based on and claims priority pursuant to 35 U.S.C. §119 to Japanese Patent Application No. 2011-194597, filed on Sep. 7, 2011, in the Japan Patent Office, the entire disclosure of which is hereby incorporated by reference herein.

BACKGROUND OF THE INVENTION

1. Field of the Invention

The present invention relates to a technology of performing image processing, more specifically to an image processing apparatus, an image processing method, a storage medium, and an image processing system that project a three-dimensional image photographed with a relatively wide view angle to a planar image.

2. Description of the Related Art

A system that displays a still image photographed by, for example, a camera on a flat display device connected to a computer has been known. The computer of the system combines a plurality of images of a subject photographed from different angles in a partially overlapping manner and causes an image viewer operated in the computer to display, on a flat display device, a composite image combining the plurality of images (hereinafter, the system will be referred to as a panoramic image viewer).

The existing panoramic image viewer supports various display changing operations, such as panning (i.e., leftward or rightward movement of the field of view), tilting (i.e., upward or downward movement of the field of view), and zooming (i.e., magnification or reduction), to be performed on a panoramic image combining the plurality of images. The panoramic image is formed as a combination of images of the same subject photographed at different angles. Therefore, particularly when images photographed by a camera having a zoom function or a fisheye lens for photographing in a wider field of view than the field of view of a normal lens system are projected onto a plane and combined together, a person may perceive unnaturalness or distortion in the panoramic image particularly at edge portions of the field of view.

The panoramic image viewer typically employs a method of projecting and displaying, on a plane, an image disposed on a cylindrical side surface of a cylinder or a spherical surface of a sphere and as viewed from the center of the cylinder or the sphere. When projecting and displaying such an image on a plane, a user is allowed to perform processes, such as panning, tilting, and zooming, on the image to be displayed. Further, a three-dimensional image focused on the cylindrical side surface of the cylinder or the spherical surface of the sphere is projection-transformed to a planar image and displayed on a flat display in accordance with user-set pan, tilt, and zoom parameters.

In this case, a central projection method, which is a projection transformation method used for a standard camera lens, is typically used. According to the method, the image displayed on the plane looks similar to the image photographed by a camera.

For example, to transform a three-dimensional image acquired in an omnidirectional format to an image on a flat display to be viewed by a person, projection transformation is performed to transform the three-dimensional image to a planar image. In the projection transformation, on the assumption that an image disposed on the spherical surface of a sphere is viewed from the center of the sphere, the angle of a given point of the image from the center (i.e., half view angle) is transformed to the distance of the point from the center of a plane (i.e., image height).

As well as the above-described central projection method, major projection transformation methods include a stereographic projection method, an equidistant projection method, an equisolid angle projection method, and an orthogonal projection method. FIG. 1 illustrates respective projection transformation equations and inverse projection transformation equations of projection transformation methods used in the above-described projection methods. The central projection method is usually employed in photographing by a camera equipped with a standard camera lens. The other four methods are usually employed in photographing by a camera with a fisheye lens having a super-wide view angle.

Each of FIGS. 2A to 2D illustrates an image photographed by a camera and mapped onto a plane. FIG. 2A illustrates an image photographed with a lens system having a relatively narrow view angle and mapped onto a plane by the central projection method. FIG. 2B illustrates an image photographed with a lens system having a relatively wide view angle and mapped onto a plane by the central projection method. FIG. 2C illustrates an image photographed with a lens system having a relatively narrow view angle and mapped onto a plane by the stereographic projection method. FIG. 2D illustrates an image photographed with a lens system having a relatively wide view angle and mapped onto a plane by the stereographic projection method. In many image processing apparatuses each functioning as the panoramic image viewer, the projection method is fixed to the central projection method, not depending on the maximum half view angle of the image to be displayed. This is because the maximum half view angle of a camera used in the existing panoramic image viewer is approximately 30 degrees, and visually obvious image distortion is barely perceived within this half view angle.

Further with reference to FIGS. 2A to 2D, if the view angle is relatively narrow, the image based on the central projection method is not particularly unnatural, as illustrated in FIG. 2A. If a camera having a relatively wide view angle is used, however, an issue arises. For example, as illustrated in FIG. 2B, if the central projection method is applied to the image photographed with a relatively wide view angle, an unnatural image is produced in which a person, who is the same subject as that of FIG. 2A, has an arm stretched unnaturally long toward an edge portion of the image.

That is, when a three-dimensional image photographed with a relatively wide view angle is projected to a planar image in accordance with the central projection method, visual unnaturalness is produced in an area of a relatively wide half view angle, i.e., in an edge portion of the planar image, as illustrated in FIG. 2B. In addition, as understood from the transformation equations illustrated in FIG. 1, according to the central projection method, the value overflows when a half view angle φ is 90 degrees. To display an area of a maximum half view angle of 90 degrees or more, therefore, an additional process is required.

Meanwhile, FIGS. 2C and 2D illustrate planar images obtained from the same images as those used in FIGS. 2A and 2B through transformation using the stereographic projection method as a different projection method. FIG. 2C illustrates an image photographed with a lens system having a relatively narrow view angle, and FIG. 2D illustrates an image photographed with a lens system having a relatively wide view angle. As illustrated in FIGS. 2C and 2D, it is understood that the stereographic projection reduces the unnaturalness, i.e., the unnaturally stretched arm of a person, observed in one of the planar images according to the central projection method at an edge portion of the planar image corresponding to image data of the three-dimensional image having a relatively wide half view angle.

If the above-described images are examined more closely, however, it is recognized that the images of background lines appear substantially straight in the images according to the central projection, but appear slightly bent in the images according to the stereographic projection in both the relatively narrow view angle and the relatively wide view angle. As described above, the existing panoramic image viewer is limited in providing an image with no unnaturalness produced in an area of a relatively wide view angle.

In many standard cameras, the view angle ranges from approximately 50 degrees to approximately 75 degrees. As illustrated in FIG. 2B, if an image photographed with a relatively wide view angle is transformed to a planar image only by the use of the central projection method, the planar image has noticeable deformation attributed to substantial stretching of the image occurring in edge portions of the image having a relatively wide view angle, in which the image is substantially stretched in the tangential direction of a polar coordinate system centering on a point of the image corresponding to the center of the lens. Consequently, if a system directly using the existing projection transformation method is employed as the panoramic image viewer using a still image photographed with a relatively wide view angle, more or less unnaturalness is produced in the entire resultant image.

Concerning the above-described projection methods, there is a known technique of projecting onto a plane an arbitrary portion of a distorted circular image photographed with a fisheye lens. According to the background technique, to cut out the desired arbitrary portion from the distorted circular image photographed with a fisheye lens and transform the cut-out image to a less distorted planar image, the image photographed with a fisheye lens and related to a spherical surface of a sphere is cut out to be related to a cylindrical side surface of a cylinder having an axial direction perpendicular to the planar image, and thereby the distortion occurring at horizontal edges of the image is adjusted.

The above-described technique is capable of reducing visually perceptible unnatural distortion; however, it reduces the unnatural distortion by using a curved surface of the cylinder, and thus the reduction of the unnatural distortion is limited to one direction, i.e., the horizontal direction. Therefore, a planar image distorted differently between the horizontal direction and the vertical direction may be produced, and thus visual unnaturalness different from that caused by the foregoing existing panoramic image viewer may be caused. That is, in the panoramic image viewer that displays, on a substantially flat display surface, an image photographed with a relatively wide view angle, the reduction of unnaturalness of the image, which is attributed to image distortion caused by stretching of a subject at upper, lower, left, and right edge portions of the image, still remains to be addressed.

SUMMARY OF THE INVENTION

The present invention describes a novel image processing apparatus. In one example, a novel image processing apparatus projects three-dimensional image data to two-dimensional planar image data, and includes an accumulation unit, an acquisition unit, a creation unit, and a display unit. The accumulation unit is configured to accumulate the three-dimensional image data accompanied by position coordinates and pixel values. The acquisition unit is configured to acquire a display parameter for the two-dimensional planar image data to be created. The display parameter includes a zoom parameter for changing image size. The creation unit is configured to create the two-dimensional planar image data from a part of the three-dimensional image data with the use of the display parameter by determining a half view angle of the three-dimensional image data from position coordinates corresponding to the center of the two-dimensional planar image data, and performing inverse projection transformation on the two-dimensional planar image data while changing, in accordance with a change in the half view angle caused by the change in image size specified by the zoom parameter, an inverse projection transformation method applied to position coordinates used to create the two-dimensional planar image data. The display unit is configured to display the created two-dimensional planar image data as a two-dimensional planar image.

The above-described image processing apparatus may further include a user input unit to accept a change in value of the display parameter input by a user. The acquisition unit acquires the changed value of the display parameter as the display parameter for the two-dimensional planar image data to be created.

The creation unit may determine, in accordance with the inverse projection transformation method, position coordinates of the three-dimensional image data corresponding to position coordinates of the two-dimensional planar image data to be created, and map pixel values of the determined position coordinates of the three-dimensional image data as pixel values of the position coordinates of the two-dimensional planar image data to be created.

In accordance with the half view angle, the creation unit may select, as a method of performing the inverse projection transformation on the two-dimensional planar image data, one of central projection, stereographic projection, and weighted interpolation projection causing a gradual shift from the central projection to the stereographic projection.

The present invention further describes a novel image processing method. In one example, a novel image processing method is performed by an image processing apparatus to project three-dimensional image data to two-dimensional planar image data, and includes accumulating the three-dimensional image data accompanied by position coordinates and pixel values, acquiring a display parameter for the two-dimensional planar image data to be created, the display parameter including a zoom parameter for changing image size, creating the two-dimensional planar image data from a part of the three-dimensional image data by using the display parameter, and displaying the created two-dimensional planar image data as a two-dimensional planar image. The creating includes acquiring the zoom parameter for changing image size, determining a half view angle of the three-dimensional image data from position coordinates corresponding to the center of the two-dimensional planar image data, the half view angle changed in accordance with a change in value of the zoom parameter, and performing inverse projection transformation on the two-dimensional planar image data, while changing, in accordance with the determination result, an inverse projection transformation method applied to position coordinates used to create the two-dimensional planar image data.

The creating may further include determining, in accordance with the inverse projection transformation method, position coordinates of the three-dimensional image data corresponding to position coordinates of the two-dimensional planar image data to be created, and mapping pixel values of the determined position coordinates of the three-dimensional image data as pixel values of the position coordinates of the two-dimensional planar image data to be created.

In accordance with the half view angle, the performing may select, as a method of performing the inverse projection transformation on the two-dimensional planar image data, one of central projection, stereographic projection, and weighted interpolation projection causing a gradual shift from the central projection to the stereographic projection.

A non-transitory storage medium storing a program executable by an image processing apparatus may cause the image processing apparatus to perform the above-described image processing method.

The present invention further describes a novel image processing system. In one example, a novel image processing system projects three-dimensional image data to two-dimensional planar image data, and includes a server apparatus and a client apparatus. The server apparatus is connected to a network, and includes an accumulation unit, an application unit, and a data transmission unit. The accumulation unit is configured to accumulate the three-dimensional image data accompanied by position coordinates and pixel values. The application unit is configured to acquire a display parameter, which includes a zoom parameter for changing image size, for two-dimensional planar image data to be created, and is configured to create the two-dimensional planar image data from a part of the three-dimensional image data with the use of the display parameter by determining a half view angle of the three-dimensional image data from position coordinates corresponding to the center of the two-dimensional planar image data, and performing inverse projection transformation on the two-dimensional planar image data while changing, in accordance with a change in the half view angle caused by the change in image size specified by the zoom parameter, an inverse projection transformation method applied to position coordinates used to create the two-dimensional planar image data. The data transmission unit is configured to transmit the two-dimensional planar image data created by the application unit. The client apparatus is connected to the network, and includes a parameter transmission unit, a display unit, and a browser unit. The transmission unit is configured to transmit to the server apparatus the display parameter for acquiring the two-dimensional planar image data. The display unit is configured to display, as a two-dimensional image, the two-dimensional planar image data transmitted from the server apparatus. The browser unit is configured to cause the display unit to display the two-dimensional planar image data as the two-dimensional image.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein:

FIG. 1 is a table illustrating respective projection transformation equations and inverse projection transformation equations of projection transformation methods used in different projection methods;

FIG. 3 is a functional block diagram of an image processing apparatus according to an embodiment of the present invention;

FIG. 7 is a flowchart illustrating in detail major steps of the image processing executed by the image processing apparatus according to the present embodiment;

DETAILED DESCRIPTION OF THE INVENTION

Figure 2B:
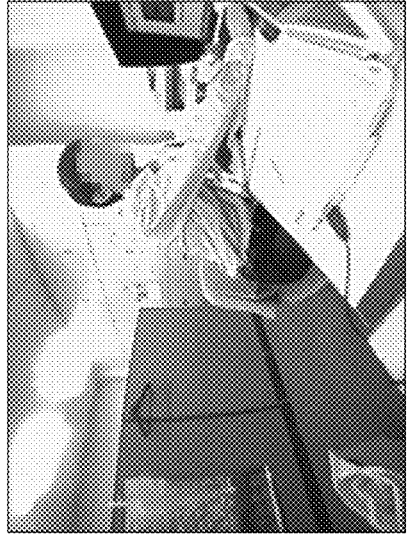
FIGS. 2A and 2B are diagrams illustrating images photographed by an existing camera with a relatively narrow view angle and a relatively wide view angle, respectively, with each of the images mapped onto a plane by a central projection method.
Figure 2D:
FIGS. 2C and 2D are diagrams illustrating images photographed by the existing camera with a relatively narrow view angle and a relatively wide view angle, respectively, with each of the images mapped onto a plane by a stereographic projection method.
Figure 2A:
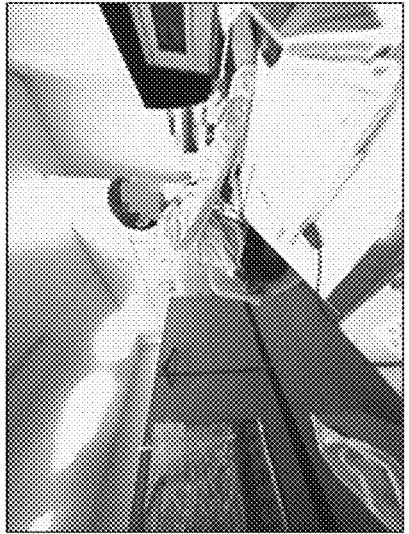
Figure 2C:

In describing the embodiments illustrated in the drawings, specific terminology is adopted for the purpose of clarity. However, the disclosure of the present invention is not intended to be limited to the specific terminology so used, and it is to be understood that substitutions for each specific element can include any technical equivalents that operate in a similar manner and achieve a similar result.

Referring now to the drawings, wherein like reference numerals designate identical or corresponding parts throughout the several views, embodiments of the present invention will be described. FIG. 3 is a functional block diagram of an image processing apparatus 100 according to an embodiment of the present invention. The image processing apparatus 100 of FIG. 3 is configured to include a personal computer 102 (hereinafter referred to as the PC 102). The PC 102 is connected to a display device 112, a keyboard 120, a mouse 122, and a storage device 124, such as a hard disk device, and stores image information. A user is allowed to interactively issue commands to the PC 102 to execute image processing.

A personal computer or a workstation, for example, may be employed as the PC 102. The PC 102 includes, for example, a random access memory (RAM) and a read-only memory (ROM). Further, the PC 102 is equipped with a processor, such as a Pentium (registered trademark) series processor, a Core (registered trademark) series processor, a Xeon (registered trademark) series processor, or a Power PC (registered trademark) series processor, and is capable of operating various operating systems and executing various application programs. The processor equipped in the PC 102 may be a single-core processor or a multi-core processor.

The PC 102 is capable of executing application programs described in various programming languages and operating under the control of an operating system (OS), such as Windows (registered trademark), Mac OS (registered trademark), Unix (registered trademark), or Linux (registered trademark). An application program (hereinafter simply referred to as the application) according to an embodiment of the present invention causes the PC 102 to operate as later-described functional units illustrated in FIG. 3.

As another embodiment of the image processing apparatus 100, the PC 102 may be implemented as a tablet-type PC, such as a camera device, a smart phone, or an iPad (registered trademark), installed with an OS for a mobile terminal, such as Windows CE (registered trademark), and supporting input to the image processing apparatus 100 via a touch panel. Further, in still another embodiment of the image processing apparatus 100, the PC 102 may be implemented as a Web server or a service server that provides a cloud service.

As illustrated in FIG. 3, the PC 102 includes, as the functional units thereof, a display data acquisition unit 104, a position coordinate transformation unit 106, a pixel value mapping unit 108, and an interface unit 110. The display data acquisition unit 104 acquires data of display parameters for displaying an image acquired with a relatively wide view angle. The display parameters used at the initial stage may be prepared as default settings by the application, or the initial settings of the display parameters may be set by a user with the use of the keyboard 120 and/or the mouse 122 upon start of execution of the application.

Further, the user is allowed to interactively change the image display state while looking at a planar image 114 displayed on the display device 112. The user is allowed to issue commands to adjust the display parameters by using graphical user interfaces (GUIs) displayed on the display device 112 via the keyboard 120 and/or the mouse 122, to thereby perform changes in the display state of the image to be displayed, such as pan, tilt, and zoom. The display device 112 illustrated in FIG. 3 provides, on a display screen thereof, GUIs such as a zoom operation button 116 for issuing a command for zooming a pan-tilt operation button 118 for issuing a command for upward or downward tilting, and a command for leftward or rightward panning.

To adjust a display parameter in accordance with the purpose, specifically to adjust the zoom parameter, for example, the user clicks the zoom operation button 116 with the mouse 122. Thereby, the setting of the magnification or reduction ratio is received. The zoom operation button 116 includes a button with a positive sign for magnification and a button with a negative sign for reduction. In the present specification, the term magnification refers to fixing an image frame for displaying the planar image 114 and displaying, in the image frame, an image magnified in size. Conversely, the term reduction refers to reducing the size of an image displayed in the image frame. The image frame is fixed, unless the size thereof is changed by the user. Therefore, the position coordinates of three-dimensional image data corresponding to edge portions of a planar image specified by the zoom parameter are calculated by inverse projection transformation of the edge portions of the planar image. The operation using the mouse 122 may be replaced by input based on pressing of a specific key on the keyboard 120, such as a key with a positive sign or a negative sign, for example.

When the pan-tilt operation button 118 is clicked by the user with the mouse 122, a pan or tilt setting input by the user is received. The pan-tilt operation button 118 includes a button with a left-pointing arrow for leftward panning, a button with a right-pointing arrow for rightward panning, a button with an upward-pointing arrow for upward tilting, and a button with a downward-pointing arrow for downward tilting. The input using the mouse 122 may be replaced by input based on pressing of a specific key on the keyboard 120, such as a key with a left-pointing arrow, a right-pointing arrow, an upward-pointing arrow, or a downward-pointing arrow, for example.

The position coordinate transformation unit 106 interactively adjusts display data by using the display parameters acquired by the display data acquisition unit 104. In an implementation process, the range of the image to be displayed in the image frame is first determined. Therefore, with reference to the zoom parameter, the PC 102 estimates a maximum half view angle ($\phi_{max}$) of three-dimensional image data corresponding to the area of the planar image 114 to be displayed, determines the inverse projection transformation method to be employed, and identifies the position coordinates of the corresponding wide view angle image. Thereafter, with the use of other display data, such as the pan parameter and the tilt parameter, the PC 102 determines the corresponding position coordinates of the wide view angle image to be displayed, and calculates plane coordinates by applying projection transformation to the position coordinates of the wide view angle image. Then, the pixel value mapping unit 108 maps, to the corresponding position coordinates of the calculated plane coordinates, RGB pixel values of the position coordinates of the wide view angle image corresponding to the plane coordinates, and thereby creates planar image data. Then, video data of the planar image data is transmitted to the display device 112 via the interface unit 110, and the planar image 114 is displayed to the user.

The interface unit 110 illustrated herein includes the functions of various interfaces included in the PC 102, such as universal serial bus (USB), video graphics array (VGA), extended graphics array (XGA), parallel advanced technology attachment (PATA: parallel ATA), serial advanced technology attachment (SATA: Serial ATA), SATA II, a small computer system interface (SCSI), and a network interface, for example. The interface unit 110 controls the input and output of data between the PC 102 and an external device or an external network.

The wide view angle image to be viewed as the planar image 114 by the user may be downloaded to the storage device 124, such as a hard disk device, for example, by the PC 102 via a network 126, such as a local area network (LAN) or the Internet. In another embodiment, image data photographed with a relatively wide view angle and stored in the storage device 124 by the user may be used as the wide view angle image to be viewed as the planar image 114. The wide view angle image to be viewed as the planar image 114 can be either still image or moving image (animation).

Figure 4:
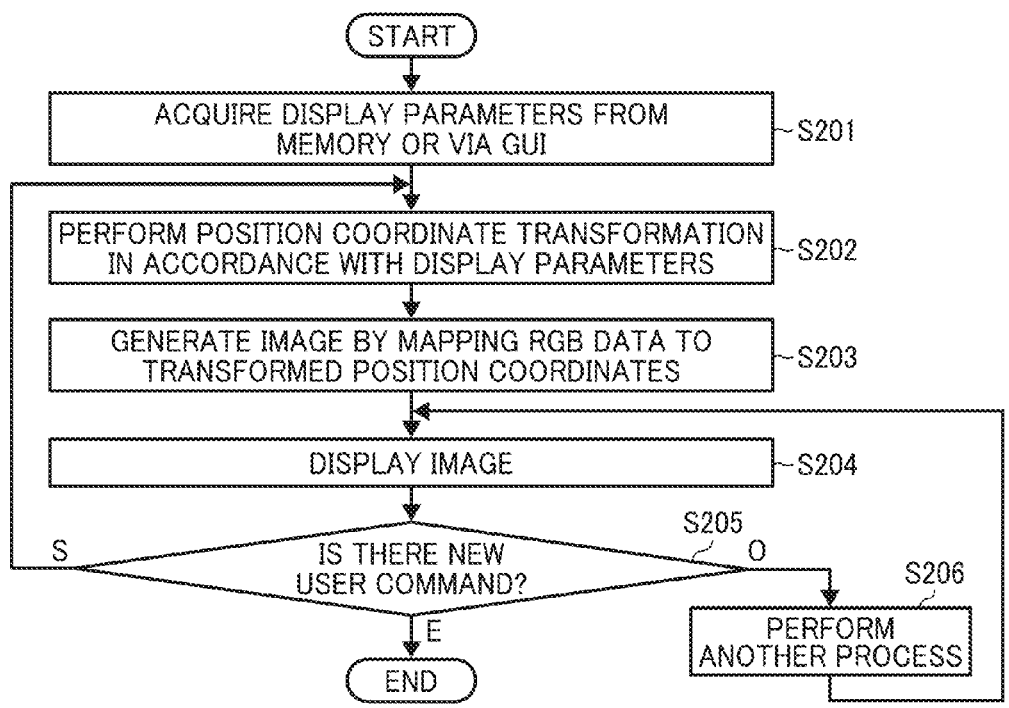
FIG. 4 is a flowchart of image processing executed by the image processing apparatus according to the present embodiment.

FIG. 4 illustrates a flowchart of the image processing executed by the image processing apparatus 100 according to the present embodiment. At step S201 in the processing of FIG. 4, the display parameters are acquired via the GUIs or from a not-illustrated memory. At step S202, position coordinate transformation is executed in accordance with the display parameters. At step S203, the transformed position coordinates are mapped with RGB data of the corresponding positions of a wide view angle image, and thereby planar image data is generated. Thereafter, at step S204, video data is created with the use of the planar image data, and the planar image 114 is displayed on the display device 112.

At step S205, it is determined whether or not a new user command, such as a redisplay, end, print, or save command, for example, has been received. If the redisplay command is received as the new user command (S at step S205), the processing returns to step S202 to perform coordinate transformation and mapping for redisplay, and the planar image 114 is again displayed at step S204. Further, if a command to perform another process is received as the new user command (O at step S205), the other process is invoked and performed at step S206, and thereafter the processing returns to step S204 to wait for a new user command. Further, if the end command is received as the new user command (E at step S205), the processing of FIG. 4 is completed. The processing illustrated in FIG. 4 allows the user to interactively perform the image processing of transforming the wide view angle image to the planar image 114.

Figure 5A:
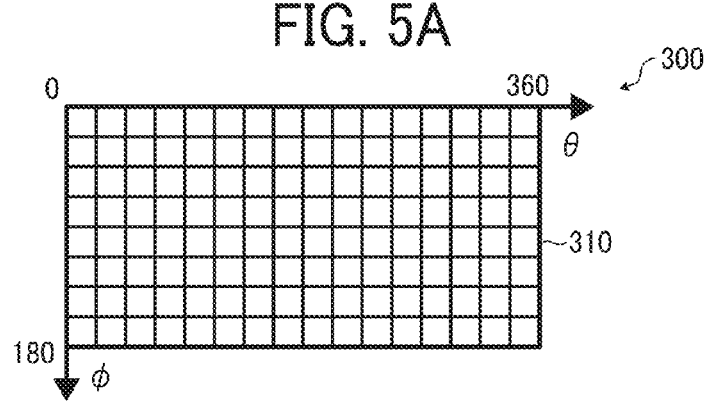
FIGS. 5A and 5B are diagrams illustrating projection transformation and inverse projection transformation executed by the image processing apparatus according to the present embodiment, with FIG. 5A illustrating a position coordinate representation of a planar image and FIG. 5B illustrating a position coordinate representation of an omnidirectional image.
Figure 5B:
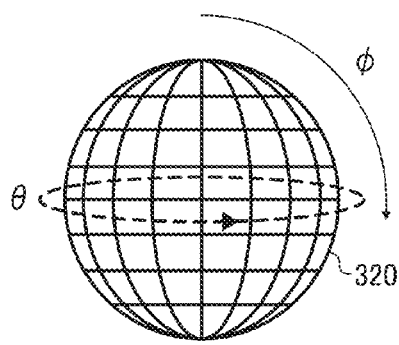

FIGS. 5A and 5B are diagrams illustrating projection transformation and inverse projection transformation executed by the image processing apparatus 100 according to the present embodiment. FIG. 5A illustrates a position coordinate representation of a planar image 310. FIG. 5B illustrates a position coordinate representation of an omnidirectional image 320 as an image exemplifying the wide view angle image. As to the central projection method, for example, the omnidirectional image 320 is provided with position coordinates of pixels in a polar coordinate system having a radius corresponding to a focal distance f, as understood from the equations of FIG. 1, and an angle θ in the longitudinal direction is defined counterclockwise in a range of from 0 degree to 360 degrees. Further, in the present embodiment, an angle φ in the latitudinal direction measured from a given pole is defined in a range of from 0 degree to 180 degrees. In the present embodiment, an image on a curved surface of the omnidirectional image 320 will be discussed, and description of the image in terms of the longitude will be omitted below, except in the description of a process for changing the inverse projection transformation method.

Each of the pixels of the omnidirectional image 320 is assigned position coordinates. The pixel is accompanied by image data representing an image characteristic of the pixel. In a typical format, the intensity of each of red (R), green (G), and blue (B) color signals corresponding to the three primary colors is defined for each of the colors by an 8-bit value ranging from 0 to 255. For example, if the number of pixels is 1801 in the latitudinal direction and 3600 in the longitudinal direction, the image data is defined every 0.1 degrees both in the latitudinal direction and the longitudinal direction. Herein, the number of pixels in the latitudinal direction is not 1800 but 1801, since an end point is added to 1800 divided segments of the area from 0 degree to 180 degrees. Meanwhile, in the longitudinal direction, the area from 0 degree to 360 degrees is divided into 3600 segments. In this case, the pixel at a point of 0 degree serving as an end point and the pixel at a point of 360 degrees represent the same point on the spherical surface, and thus only one of the two pixels is counted.

When projecting the omnidirectional image 320 to the planar image 310, the image processing apparatus 100 according to the present embodiment receives the user settings of the display parameters for the planar image 310. Then, in response to the adjustment of the display parameters, the image processing apparatus 100 eliminates as much distortion as possible in the area from a central portion to edge portions of the image, and thereby causes the display device 112 of the PC 102 to favorably display the wide view angle image to the user.

Figure 6A:
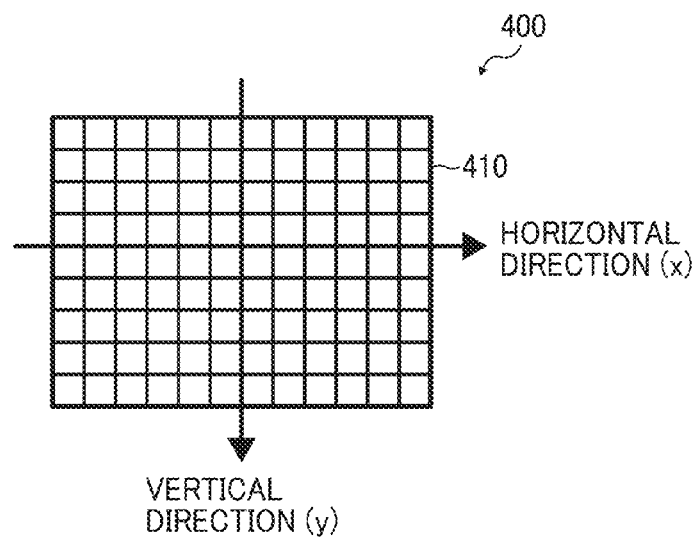
FIGS. 6A and 6B are diagrams illustrating a relationship in projection between a planar image and a wide view angle image of the present embodiment in accordance with the central projection method.
Figure 6B:
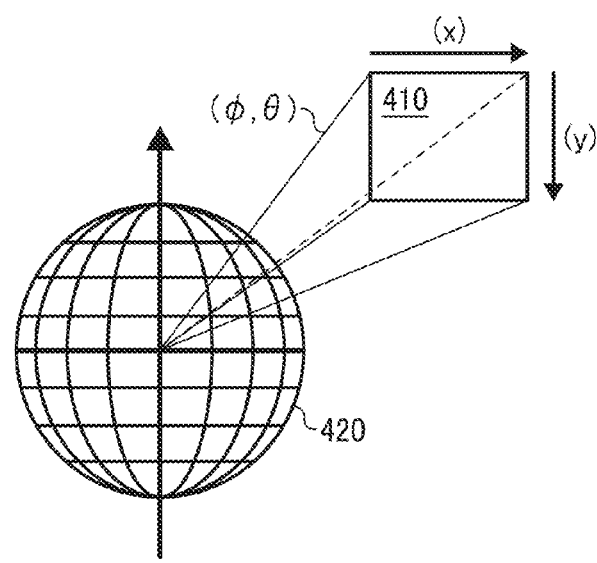

FIGS. 6A and 6B are diagrams illustrating the relationship in projection between a planar image 410 and a wide view angle image 420 of the present embodiment in accordance with the central projection method. The format of the planar image 410 is represented by a Cartesian coordinate system on a two-dimensional plane, and has image data characterized by position coordinates corresponding to plane coordinates (x, y). The image data is accompanied by 8-bit depth RGB intensity data for each of the position coordinates.

The planar image 410 corresponds to an image to be viewed by the user or viewer when the user looks, from the center of a sphere corresponding to the wide view angle image 420, at a point of a specific latitude and longitude on a spherical surface or a three-dimensional curved surface of the wide view angle image 420 exemplified by an omnidirectional image. As understood from FIGS. 6A and 6B, in a process in which the image data mapped to the curved surface of the wide view angle image 420 is remapped to the planar image 410, the image data is substantially realistically mapped near the center of the planar image 410. In accordance with the increase in half view angle, however, the visual influence on the planar image 410 is increased toward edge portions of the planar image 410 in accordance with the method of mapping the curved or spherical surface of the wide view angle image 420 to a plane.

FIG. 7 is a flowchart illustrating in detail major steps of the image processing executed by the image processing apparatus 100 according to the present embodiment. At step S501 of FIG. 7, the display parameters acquired at step S201 of FIG. 4 are read from an appropriate memory, such as a buffer memory. The acquired initial parameters may be user-input parameters specifying pan, tilt, and zoom, or may be parameters in the default settings of the system. When inputting the pan, tilt, and zoom parameters, the user sets the respective parameters via the GUIs illustrated in FIG. 3. For example, the pan parameter may be set such that the immediately preceding pan parameter value is incremented by 1 degree in response to each pressing of the right-pointing arrow button of the pan-tilt operation button 118, and is decremented by 1 degree in response to each pressing of the left-pointing arrow button of the pan-tilt operation button 118.

Further, the tilt parameter may be set such that the immediately preceding tilt parameter value is incremented by 1 degree in response to each pressing of the upward-pointing arrow button of the pan-tilt operation button 118, and is decremented by 1 degree in response to each pressing of the downward-pointing arrow button of the pan-tilt operation button 118. Further, the zoom parameter may be similarly set such that the immediately preceding zoom parameter value is incremented by a set value in response to each pressing of the positive sign button of the zoom operation button 116, and is decremented by the set value in response to each pressing of the negative sign button of the of the zoom operation button 116.

Figure 8:
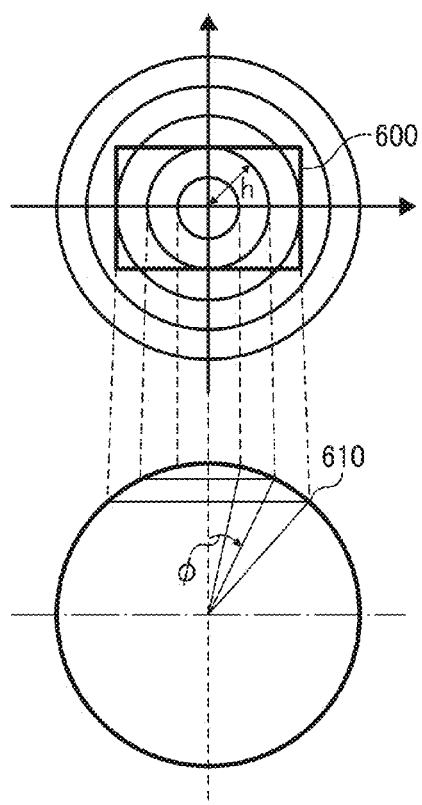
FIG. 8 is a diagram illustrating parameters used in the present embodiment to transform an omnidirectional image to a planar image.

At step S502, with reference to the zoom parameter, the maximum half view angle $\phi_{max}$ (degrees) of the planar image to be displayed is first calculated. To describe the process of step S502, respective parameters will now be described with reference to FIG. 8 on the assumption that an omnidirectional image 610 is transformed into a planar image 600, and that the omnidirectional image 610 corresponds to the three-dimensional image data. The form of the three-dimensional image data, however, is not limited to the omnidirectional image, and may have any curved surface, such as a semispherical surface, a hyperboloid surface, or an elliptical surface. Herein, a half view angle $\phi_{im}$ (degrees) is defined as the data of latitude measured from, among the position coordinates of the omnidirectional image 610 corresponding to edge portions of the planar image 600 to be displayed, the position coordinates corresponding to a position at which the omnidirectional image 610 is directly projected to the planar image 600.

The process of step S502 is performed to magnify or reduce the planar image 600 in accordance with the specified value of the zoom parameter, and calculate the data of latitude of the position coordinates of the spherical image corresponding to an edge portion of the magnified or reduced planar image 600. In this process, the data of latitude corresponding to the half view angle $\phi_{im}$ is calculated by the following formula (1) using a zoom parameter iZoom.

$$\phi_{im} = \phi_{initial} + INCR \times iZoom \quad (1)$$

In the above formula (1), $\phi_{initial}$ represents the immediately preceding value of the half view angle of the planar image 600, and may be set to, for example, 30 degrees as a default value. Further, INCR represents a constant that defines the half view angle that changes in accordance with the change in value of the zoom parameter iZoom. The constant INCR may be set to 10 degrees, for example. The change of the inverse projection transformation method according to the adjustment of the display parameter may be estimated by direct use of the above formula (1), for example. In another embodiment, the currently used inverse projection transformation method may continue to be employed to calculate the corresponding position coordinates of the three-dimensional image data and estimate the change of the inverse projection transformation method by using the corresponding half view angle $\phi_{im}$.

After the half view angle $\phi_{im}$ of the planar image 600 to be displayed is determined at step S502, the processing proceeds to step S503. At step S503, for the respective position coordinates (x, y) of the pixels of the planar image 600, the corresponding position coordinates ($\phi$, $\theta$) of the pixels of the omnidirectional image 610 are calculated. The transformation between the position coordinates (x, y) of the planar image 600 and the position coordinates ($\phi$, $\theta$) of the omnidirectional image 610 is performed in accordance with the following formula (2).

$$h = (x^2 + y^2)^{1/2}$$

$$\phi = \text{inv\_projection}(h)$$

$$\theta = \arctan(y/x) \text{ when } x > 0$$

$$\theta = 90 \text{ when } x = 0, y > 0$$

$$\theta = 270 \text{ when } x = 0, y < 0$$

$$\theta = \arctan(y/x) + 180 \text{ when } x < 0 \quad (2)$$

In the above formula (2), a function arc tan( ) returns a value in an angle range of from 0 degree to 180 degrees, and h represents the image height. Further, inv_projection( ) represents an inverse projection transformation function used in the present embodiment. The function inv_projection( ) will be described in detail later.

At step S504, on the basis of the pan parameter and the tilt parameter, rotating coordinate transformation is performed on the position coordinates ($\phi$, $\theta$) of the omnidirectional image 610 in accordance with the following formula (3). In the following formula (3), the pan parameter and the tilt parameter are represented as a rotation angle $\alpha$ and a rotation angle $\beta$, respectively.

$$x1 = \sin(\phi 1)\cos(\theta 1) \quad (3)$$

$$y1 = \sin(\phi 1)\sin(\theta 1)$$

$$z1 = \cos(\phi 1)$$

$$\begin{pmatrix} x2 \\ y2 \\ z2 \end{pmatrix} = \begin{pmatrix} 1 & 0 & 0 \\ 0 & \cos(\beta) & \sin(\beta) \\ 0 & -\sin(\beta) & \cos(\beta) \end{pmatrix} \begin{pmatrix} \cos(\alpha) & \sin(\alpha) & 0 \\ -\sin(\alpha) & \cos(\alpha) & 0 \\ 0 & 0 & 1 \end{pmatrix} \begin{pmatrix} x1 \\ y1 \\ z1 \end{pmatrix}$$

$$\phi 2 = \arctan(y2/x2) \quad \text{(when } x2 > 0\text{)}$$
$$\phi 2 = 90 \quad \text{(when } x2 = 0, y2 > 0\text{)}$$
$$\phi 2 = 270 \quad \text{(when } x2 = 0, y2 < 0\text{)}$$
$$\phi 2 = \arctan(y2/x2) + 180 \quad \text{(when } x2 < 0\text{)}$$

In the above formula (3), ($\phi 1$, $\theta 1$) represents the position coordinates of the omnidirectional image 610 indicating the pan and tilt state in the currently displayed image, and ($\phi 2$, $\theta 2$) represents the position coordinates after the coordinate transformation based on the pan parameter and the tilt parameter. In the rotating coordinate transformation according to the above formula (3), the position coordinates on the curved surface of the omnidirectional image 610 are transformed. Therefore, coordinate transformation corresponding to a polar coordinate representation is performed via pre-transformation three-dimensional spatial coordinates (x1, y1, z1) in a Cartesian coordinate system on the curved surface and post-transformation three-dimensional spatial coordinates (x2, y2, z2) in the Cartesian coordinate system.

At step S505, RGB pixel values having the position coordinates ($\phi 2$, $\theta 2$) of the omnidirectional image 610 subjected to the rotating coordinate transformation are acquired to be mapped to the position coordinates of the corresponding planar image 600.

In the omnidirectional image 610, however, the position coordinates ($\phi 1$, $\theta 1$) are assigned the pixel values at intervals of, for example, 0.1 degrees. If position coordinates of the omnidirectional image 610 assigned no pixel value are calculated as a result of the rotating coordinate transformation, therefore, interpolation may be performed by, for example, neighbor interpolation or bilinear interpolation using ambient pixel values. After the pixel values to be mapped to the pixels of the planar image 600 are thus determined, the RGB pixel values of the position coordinates of the omnidirectional image 610 are mapped to the position coordinates (x, y) of the planar image 600 to create data for the planar image 600. Then, the created data is transferred to the image display process of step S204 in FIG. 4.

Figure 9:
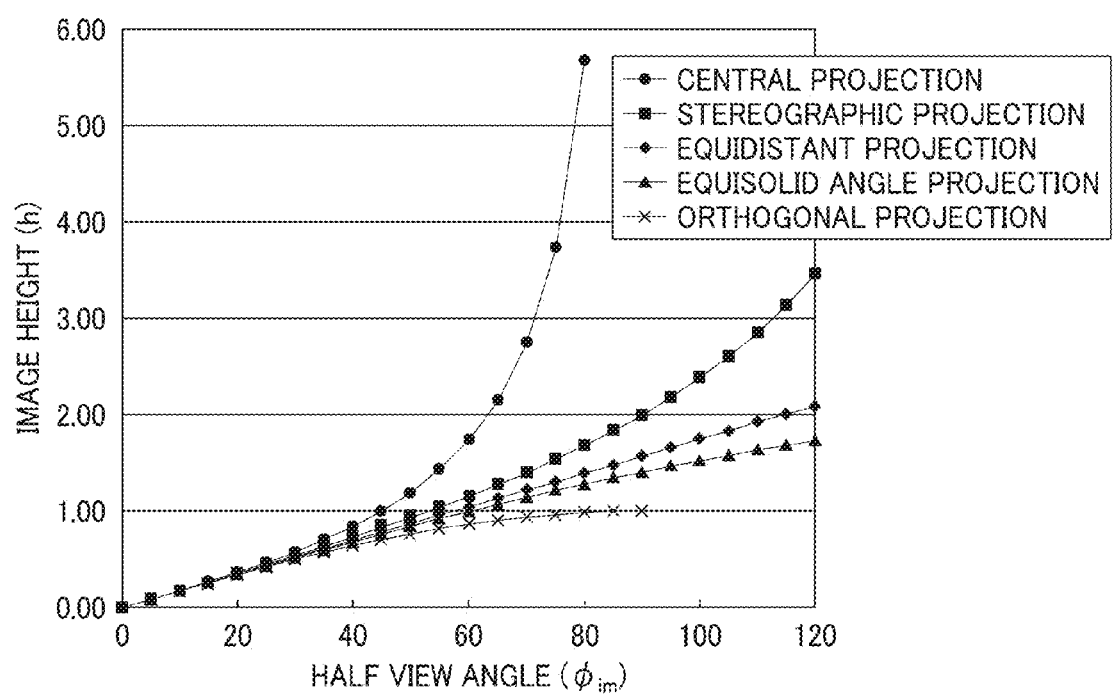
FIG. 9 is a graph plotting relationships between image height and half view angle according to the respective projection transformation methods.

FIG. 9 illustrates a graph plotting relationships between the image height h and the half view angle $\phi_{im}$ according to the foregoing projection transformation methods of FIG. 1. For convenience of description, it is assumed in the graphs that the value of the focal distance f is 1. FIG. 9 indicates that, in the central projection method, an increase in the half view angle $\phi_{im}$ results in a rapid increase in increase rate of the image height h. This indicates that an object in a wide view angle image is substantially stretched at edge portions of the image. Meanwhile, it is understood that the dependence on the half view angle $\phi_{im}$ is less in the other four methods than in the central projection method, and that the four methods are different in direction of deviation from a linearly extrapolated line of the image height h in accordance with the increase in the half view angle $\phi_{im}$.

Focusing on the relationships between the image height h and the half view angle $\phi_{im}$ according to the projection transformation methods illustrated in FIG. 9, the present embodiment selects, in accordance with the value of the maximum half view angle $\phi_{max}$ for providing the planar image to be displayed, the inverse projection transformation method to be employed. That is, in accordance with the value of the maximum half view angle $\phi_{max}$, the present embodiment employs central projection transformation as the inverse projection transformation method when the maximum half view angle $\phi_{max}$ is in a range of 10 degrees$\leq\phi_{max}<$40 degrees, and employs stereographic projection transformation as the inverse projection transformation method when the maximum half view angle $\phi_{max}$ is in a range of 80 degrees$\leq\phi_{max}<$120 degrees. This configuration provides a planer image with no unnaturalness over a relatively large area, while eliminating the defective image areas generated by the central projection transformation and the stereographic projection transformation.

The present embodiment thus changes, in accordance with the maximum half view angle $\phi_{max}$, the projection transformation method to be employed, and thereby provides a planer image with no unnaturalness over a relatively large area. Moreover, although the present embodiment employs the central projection transformation and the stereographic projection transformation, other projection transformation methods, such as equidistant projection transformation, equisolid angle projection transformation, and orthogonal projection transformation, may be used.

Further, when the maximum half view angle $\phi_{max}$ is in a range of 40 degrees$\leq\phi_{max}<$80 degrees, to prevent the occurrence of image noise accompanying a rapid shift from the central projection transformation to the stereographic projection transformation, the inverse projection transformation method is smoothly shifted, with the degree of contribution of the inverse projection transformation method changed in accordance with the maximum half view angle $\phi_{max}$.

When the maximum half view angle $\phi_{max}$ is in the range of 10 degrees$\leq\phi_{max}<$40 degrees, an inverse projection transformation equation $\phi=\arctan(h/f)$ is used, and the focal distance f is calculated as $f=h_{im}/\tan(\phi_{im})$. Herein, $h_{im}$ represents the image height corresponding to the half view angle $\phi_{im}$, and the image height $h_{im}$ corresponds to half the length of a diagonal line of the planar image. Further, when the maximum half view angle $\phi_{max}$ is in the range of 80 degrees$\leq\phi_{max}<$120 degrees, the inverse projection transformation is performed in accordance with an inverse projection transformation equation $\phi=2\cdot\arctan(h/2/f)$ of the stereographic projection transformation. Herein, the focal distance f is calculated as $f=h_{im}/2/\tan(\phi_{im}/2)$.

Further, when the maximum half view angle $\phi_{max}$ is in the range of 40 degrees$\leq\phi_{max}<$80 degrees, the transformation results obtained from the respective inverse projection transformation equations of the central projection transformation and the stereographic projection transformation are subjected to weighted interpolation, as illustrated in the following formula (4), and are assigned respective focal distances corresponding to the inverse projection transformation equations.

$$\phi=\{(80-\phi_{im})\times\arctan(h/f1)+(\phi_{im}-40)\times\arctan(h/2/f2)\}/\Delta$$

$$f1=h_{im}/\tan(\phi_{im})$$

$$f2=h_{im}/2/\tan(\phi_{im}/2) \quad (4)$$

In the above formula (4), the denominator $\Delta$ represents a normalization constant for weighting, and is calculated as the difference between the upper limit value and the lower limit value of the half view angle $\phi_{im}$ subjected to the weighted interpolation, specifically as $\Delta=80-40=40$ in the currently described embodiment. The value of the denominator $\Delta$, however, may be changed as appropriate in accordance with the number of pixels or the magnification or reduction ratio of the image to be used.

In the present embodiment, the above-described range of the maximum half view angle $\phi_{max}$ for shifting the inverse projection transformation method may be changed in accordance with the setting of the zoom parameter iZoom set by the user. As described above, the present embodiment uses the inverse projection transformation method that gradually changes the value of the inverse projection transformation equation. The present embodiment, therefore, provides an inverse projection transformation method that flexibly follows a user specification, even if the user arbitrarily changes the magnification or reduction ratio.

Figure 10:
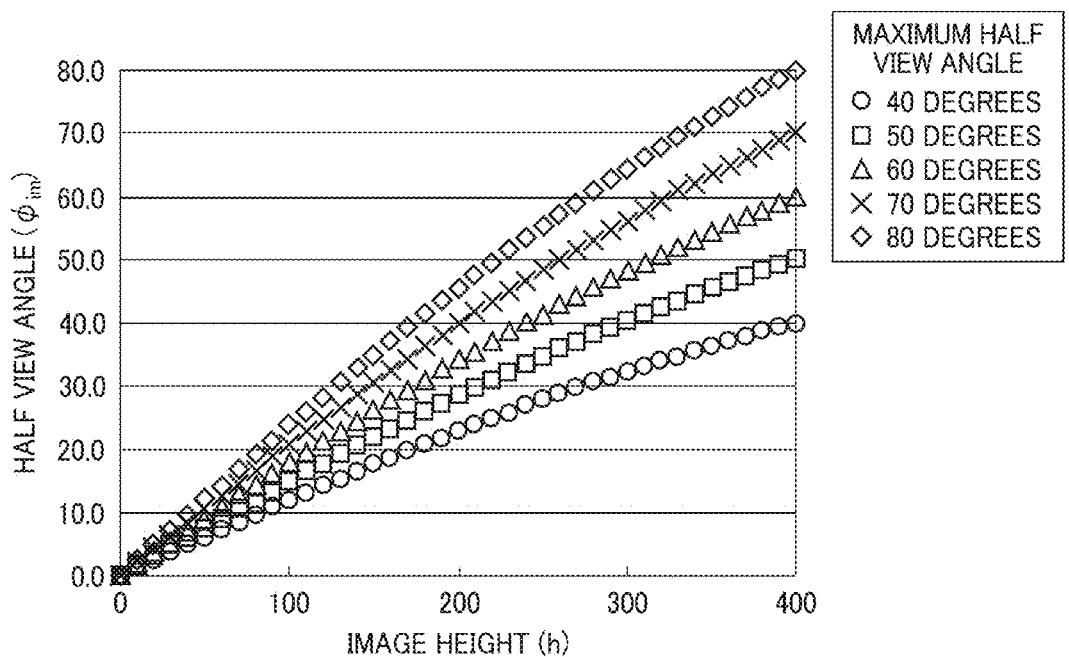
FIG. 10 is a graph illustrating, as the results of transformation using an inverse projection transformation method according to the present embodiment, plots of the half view angle against the image height obtained by changing a maximum half view angle as an image characteristic to 40 degrees, 50 degrees, 60 degrees, 70 degrees, and 80 degrees.

FIG. 10 illustrates, as the results of transformation using the inverse projection transformation method according to the present embodiment, plots of the half view angle $\phi_m$ against the image height h obtained by changing the maximum half view angle $\phi_{max}$ as an image characteristic to 40 degrees, 50 degrees, 60 degrees, 70 degrees, and 80 degrees. It is assumed in FIG. 10 that the planar image to be displayed has an image size of 640 pixels by 480 pixels. Herein, the value of the image height $h_{im}$ is 400.

Figure 11:
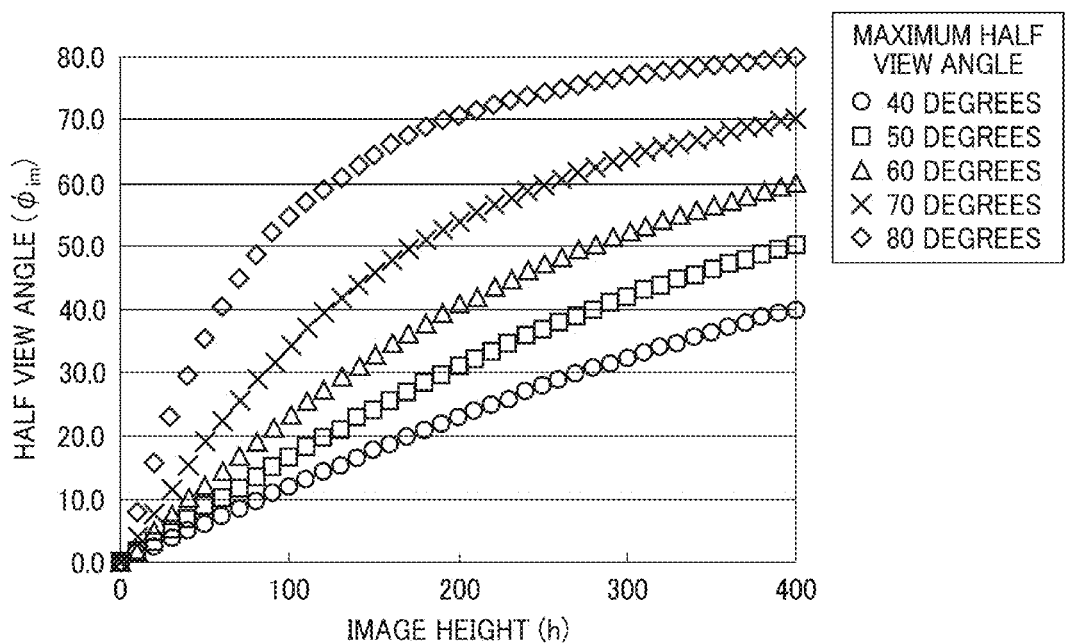
FIG. 11 is a graph as a comparative example of FIG. 10, illustrating, as the results of transformation using only the central projection method, plots of the half view angle against the image height obtained similarly as in FIG. 10 by changing the maximum half view angle to 40 degrees, 50 degrees, 60 degrees, 70 degrees, and 80 degrees.

FIG. 11 as a comparative example of FIG. 10 illustrates, as the results of transformation using only the central projection method, plots of the half view angle $\phi_{im}$ against the image height h obtained similarly as in FIG. 10 by changing the maximum half view angle $\phi_{max}$ to 40 degrees, 50 degrees, 60 degrees, 70 degrees, and 80 degrees. Comparison between FIG. 10 and FIG. 11 indicates that, in FIG. 10, the values of the half view angle $\phi_{im}$ against the values of the image height h are substantially linearly transformed in accordance with the value of the half view angle $\phi_{im}$. Meanwhile, FIG. 11 indicates that, if the inverse projection transformation uses only the central projection method, the reality of the relationship between the image height h and the half view angle $\phi_{im}$ is substantially reduced particularly when the maximum half view angle $\phi_{max}$ exceeds approximately 60 degrees, and that a planar image gradually perceived as unnatural toward edge portions of the image is consequently obtained.

Figure 12:
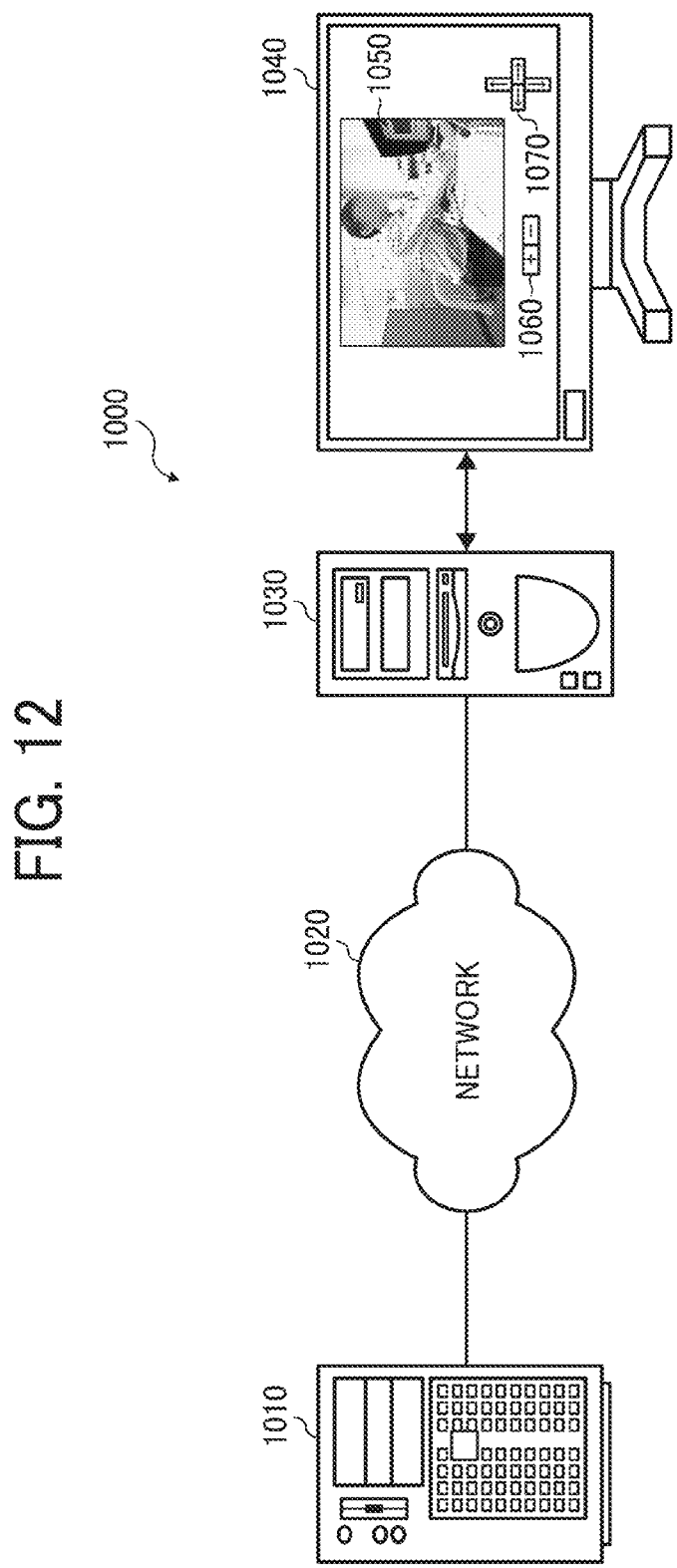
FIG. 12 is a diagram illustrating an image processing system according to an embodiment of the present invention, which includes a server having an image processing function according to an embodiment of the present invention and a client apparatus that accesses the server via a network.

FIG. 12 illustrates an image processing system 1000 according to an embodiment of the present invention, which includes a server 1010 and a client apparatus 1030. The server 1010 has an image processing function according to an embodiment of the present invention, and the client apparatus 1030 accesses the server 1010 via a network 1020 such as the Internet. The server 1010 is configured as an information processing apparatus capable of operating an OS, such as Linux (registered trademark), Unix (registered trademark), or Windows (registered trademark).

Further, with the use of a server program, such as Java (registered trademark), JavaScript (registered trademark), Perl, Ruby, or Python, the server 1010 receives a process request from the client apparatus 1030 through, for example, a common gateway interface (CGI), performs image processing by activating an image processing application, and returns and transmits the image processing result to the client apparatus 1030. Thereby, an image substantially similar to the image described with reference to FIG. 3 is displayed on a display device 1040 of the client apparatus 1030.

A PC similar in configuration to the PC 102 described with reference to FIG. 3 may be used as the client apparatus 1030. The client apparatus 1030 illustrated in FIG. 12, however, is loaded with a browser program, such as Internet Explorer (registered trademark), Mozilla (registered trademark), Opera (registered trademark), FireFox (registered trademark), or Chrome (registered trademark). The client apparatus 1030 accesses a specific uniform resource identifier (URI) of the server 1010, and issues an image processing request. Then, the server 1010 returns the client apparatus 1030 a planar image in the form of a hyper-text markup language (HTML) document in accordance with the default settings of a processing target image.

The HTML document transmitted to the client apparatus 1030 may be configured as a formatted form, for example. If a user operates a zoom operation button 1060 and/or a pan-tilt operation button 1070 displayed on a browser screen by using a not-illustrated mouse, the data of the operation is transmitted to the server 1010. Then, the server 1010 reads, as the parameters of the processing program, parameter values based on the data of the operation transmitted from the user, and performs the image processing according to the present embodiment, to thereby create a planar image. The server 1010 then transmits to the client apparatus 1030 the created planar image as linked to an image area of the form. Thereby, the display device 1040 of the client apparatus 1030 displays an image, such as an omnidirectional image, without causing any unnaturalness in the image.

In the foregoing description, the image processing system 1000 illustrated in FIG. 12 employs a Web server and Web client architecture. Needless to say, however, the image processing system 1000 illustrated in FIG. 12 may be implemented as a so-called cloud computing environment, in which the client apparatus 1030 uses an image processing service by having a contract with an Internet service provider (ISP) and sharing a specific storage area and a specific application of the server 1010.

As described above, according to the above-described embodiments, the inverse projection transformation method to be employed is controlled to smoothly shift from the central projection transformation to the stereographic projection transformation in accordance with the gradual increase of the maximum half view angle $\phi_{max}$. Accordingly, the embodiments suppress unnaturalness occurring in the representation of a wide view angle image, while preventing as much image noise as possible.

The above-described embodiments are illustrative and do not limit the present invention. Thus, numerous additional modifications and variations are possible in light of the above teachings. For example, elements or features of different illustrative embodiments herein may be combined with or substituted for each other within the scope of this disclosure and the appended claims. Further, features of components of the embodiments, such as their number, position, and shape, are not limited to those of the disclosed embodiments and thus may be set as preferred. It is therefore to be understood that, within the scope of the appended claims, the disclosure of the present invention may be practiced otherwise than as specifically described herein.

What is claimed is:

1. An image processing apparatus that projects three-dimensional image data to two-dimensional planar image data, the image processing apparatus comprising:
    an accumulation unit to accumulate the three-dimensional image data accompanied by position coordinates and pixel values;
    an acquisition unit to acquire a display parameter for the two-dimensional planar image data to be created, the display parameter including a zoom parameter for changing image size;
    a creation unit to create the two-dimensional planar image data from a part of the three-dimensional image data with the use of the display parameter by determining a half view angle of the three-dimensional image data from position coordinates corresponding to the center of the two-dimensional planar image data, and performing inverse projection transformation on the two-dimensional planar image data while changing, in accordance with a change in the half view angle caused by the change in image size specified by the zoom parameter, an inverse projection transformation method applied to position coordinates used to create the two-dimensional planar image data; and
    a display unit to display the created two-dimensional planar image data as a two-dimensional planar image.

2. The image processing apparatus according to claim 1, further comprising a user input unit to accept a change in value of the display parameter input by a user,
    wherein the acquisition unit acquires the changed value of the display parameter as the display parameter for the two-dimensional planar image data to be created.

3. The image processing apparatus according to claim 1, wherein the creation unit determines, in accordance with the inverse projection transformation method, position coordinates of the three-dimensional image data corresponding to position coordinates of the two-dimensional planar image data to be created, and maps pixel values of the determined position coordinates of the three-dimensional image data as pixel values of the position coordinates of the two-dimensional planar image data to be created.

4. The image processing apparatus according to claim 1, wherein, in accordance with the half view angle, the creation unit selects, as a method of performing the inverse projection transformation on the two-dimensional planar image data, one of central projection, stereographic projection, and weighted interpolation projection causing a gradual shift from the central projection to the stereographic projection.

5. An image processing method performed by an image processing apparatus to project three-dimensional image data to two-dimensional planar image data, the image processing method comprising:
    accumulating the three-dimensional image data accompanied by position coordinates and pixel values;
    acquiring a display parameter for the two-dimensional planar image data to be created, the display parameter including a zoom parameter for changing image size;
    creating the two-dimensional planar image data from a part of the three-dimensional image data by using the display parameter, the creating including:
        acquiring the zoom parameter for changing image size;
        determining a half view angle of the three-dimensional image data from position coordinates corresponding to the center of the two-dimensional planar image data, the half view angle changed in accordance with a change in value of the zoom parameter; and performing inverse projection transformation on the two-dimensional planar image data, while changing, in accordance with the determination result, an inverse projection transformation method applied to position coordinates used to create the two-dimensional planar image data; and displaying the created two-dimensional planar image data as a two-dimensional planar image.

6. The image processing method according to claim 5, wherein the creating further includes:

determining, in accordance with the inverse projection transformation method, position coordinates of the three-dimensional image data corresponding to position coordinates of the two-dimensional planar image data to be created; and mapping pixel values of the determined position coordinates of the three-dimensional image data as pixel values of the position coordinates of the two-dimensional planar image data to be created.

7. The image processing method according to claim 5, wherein, in accordance with the half view angle, the performing selects, as a method of performing the inverse projection transformation on the two-dimensional planar image data, one of central projection, stereographic projection, and weighted interpolation projection causing a gradual shift from the central projection to the stereographic projection.

8. A non-transitory storage medium storing a program executable by an image processing apparatus to cause the image processing apparatus to perform the image processing method according to claim 5.

9. An image processing system that projects three-dimensional image data to two-dimensional planar image data, the image processing system comprising:

a server apparatus connected to a network, and including:
an accumulation unit to accumulate the three-dimensional image data accompanied by position coordinates and pixel values;
an application unit to acquire a display parameter, which includes a zoom parameter for changing image size, for two-dimensional planar image data to be created, and configured to create the two-dimensional planar image data from a part of the three-dimensional image data with the use of the display parameter by determining a half view angle of the three-dimensional image data from position coordinates corresponding to the center of the two-dimensional planar image data, and performing inverse projection transformation on the two-dimensional planar image data while changing, in accordance with a change in the half view angle caused by the change in image size specified by the zoom parameter, an inverse projection transformation method applied to position coordinates used to create the two-dimensional planar image data; and
a data transmission unit to transmit the two-dimensional planar image data created by the application unit; and a client apparatus connected to the network, and including:
a parameter transmission unit to transmit to the server apparatus the display parameter for acquiring the two-dimensional planar image data;
a display unit to display, as a two-dimensional image, the two-dimensional planar image data transmitted from the server apparatus; and
a browser unit to cause the display unit to display the two-dimensional planar image data as the two-dimensional image.

* * * * *